United States Patent
Chen et al.

(10) Patent No.: US 8,935,509 B2
(45) Date of Patent: Jan. 13, 2015

(54) METHOD FOR CONTROLLING BMC HAVING CUSTOMIZED SDR

(75) Inventors: Chih Wei Chen, Taipei (TW); Hsiao Fen Lu, Taipei (TW)

(73) Assignee: Inventec Corporation, Taipei (TW)

( * ) Notice: Subject to any disclaimer, the term of this patent is extended or adjusted under 35 U.S.C. 154(b) by 995 days.

(21) Appl. No.: 13/033,727

(22) Filed: Feb. 24, 2011

(65) Prior Publication Data

US 2012/0110308 A1     May 3, 2012

(30) Foreign Application Priority Data

Nov. 3, 2010 (TW) ................................ 99137864 A

(51) Int. Cl.
*G06F 15/00* (2006.01)
*G06F 11/30* (2006.01)

(52) U.S. Cl.
CPC ........ *G06F 11/3072* (2013.01); *G06F 11/3031* (2013.01)
USPC ............................................................. 712/8

(58) Field of Classification Search
CPC ...... G06F 11/07; G06F 3/0227; G06F 15/177
USPC ........... 340/10.4; 709/223, 224; 712/8, 10, 13
See application file for complete search history.

(56) References Cited

U.S. PATENT DOCUMENTS

| | | | |
|---|---|---|---|
| 7,237,086 B1 * | 6/2007 | Kothandapani et al. | 712/8 |
| 8,082,440 B2 * | 12/2011 | Merizan et al. | 713/100 |
| 2004/0249913 A1 | 12/2004 | Kaufman | |
| 2009/0106571 A1 * | 4/2009 | Low et al. | 713/310 |

FOREIGN PATENT DOCUMENTS

TW     I236621     7/2005

* cited by examiner

*Primary Examiner* — Vernal Brown
(74) *Attorney, Agent, or Firm* — Morris Manning & Martin LLP; Tim Tingkang Xia, Esq.

(57) ABSTRACT

A Baseboard Management Controller (BMC) controlling method includes the steps of dividing a memory of a BMC into an original region and customized region, in which the original region includes at least one original sensor data record (SDR) and original platform event filter (PEF) corresponding to each other; providing an instruction set to at least one external system, in which the external system manages at least one customized SDR and customized PEF corresponding to each other in the customized region through the instruction set; polling the original SDR in the original region and the customized SDR in the customized region; determining whether values of the SDRs obtained through polling conform to a plurality of critical values individually corresponding to the SDRs; and obtaining a processing policy according to the corresponding PEF when at least one value of the SDR does not conform to the corresponding critical value.

11 Claims, 3 Drawing Sheets

METHOD FOR CONTROLLING BMC HAVING CUSTOMIZED SDR

CROSS-REFERENCE TO RELATED APPLICATIONS

This non-provisional application claims priority under 35 U.S.C. §119(a) on Patent Application No(s). 099137864 filed in Taiwan, R.O.C. on Nov. 3, 2010, the entire contents of which are hereby incorporated by reference.

BACKGROUND OF THE INVENTION

1. Field of Invention

The present invention relates to a method for controlling a Baseboard Management Controller (BMC), and more particularly to a method for controlling a BMC providing services to at least one external system and having a customized sensor data record (SDR).

2. Related Art

With the popularity of the computer and the fast development of the network technology, services provided by an ordinary computer or device are inadequate for use, so a server technology is developed. The server is a computer platform adept in processing the network technology, which can be connected to various network systems, and provides various application services through computers connected to the network system. In order to manage the server, an Intelligent Platform Management Interface (IPMI) technology emerges. The manager may monitor the server through the IPMI and a BMC configured in the server. The BMC manages the server through a plurality of built-in sensors, and through an SDR and a platform event filter (PEF) defined for each sensor. However, more and more server clients hope that various special monitoring requirements are achieved, which goes beyond the capacity of the ordinary BMC. The ordinary BMC fails to read the value of the sensor in extra requirements, and therefore fails to monitor.

Thus, the server manufactures need to develop different BMCs and firmware thereof for different clients to support extra sensors, which is not only lack of flexibility, but also causes piffling and time-consuming development of the BMC. In addition, during the development of the different client requirements by the engineers, different versions of firmware are written gradually and then are burnt into a read only memory (ROM) of the BMC to update the BMC. However, during the update of the firmware at each time, the BMC needs to be stopped eventually and is restarted after the update. The BMC after restarting needs to define again the SDR and the PEF, and thus it is a waste of time. Moreover, the system is easily abnormal since the extra sensors fail to be supported eventually due to redefinition of the SDR and the PEF. Therefore, the conventional updating method also has a high risk.

SUMMARY OF THE INVENTION

Accordingly, the present invention is a method for controlling a Baseboard Management Controller (BMC) having a customized sensor data record (SDR), which is applicable in the BMC having a memory, and the BMC provides services to at least one external system. The method for controlling the BMC having the customized SDR comprises the steps of dividing the memory of the BMC into an original region and a customized region, in which the original region comprises at least one original SDR and at least one original platform event filter (PEF) corresponding to each other; providing an instruction set to the external system, in which the external system manages at least one customized SDR and at least one customized PEF corresponding to each other in the customized region through the instruction set; polling the original SDR in the original region and the customized SDR in the customized region; determining whether values of the SDRs obtained through polling conform to a plurality of critical values individually corresponding to the SDRs; and obtaining a processing policy according to the corresponding PEF when at least one value of the SDR does not conform to the corresponding critical value.

The instruction set may comprise an add instruction, and the external system adds at least of the customized SDR and at least one of the customized PEF corresponding to each other in the customized region through the add instruction. The instruction set may further comprise an update instruction or a read instruction, and the external system updates or reads the customized SDR added by itself in the customized region through the update instruction or the read instruction respectively. Before the update instruction is executed, a locking program may be executed automatically, so as to prohibit the BMC from accessing the customized SDR to be updated.

The instruction set may also comprise a delete instruction, and the external system deletes the customized SDR and the customized PEF added by itself in the customized region through the delete instruction. Before the delete instruction is executed, the locking program may be executed automatically, so as to prohibit the BMC from accessing the customized SDR or the customized PEF to be deleted. The external system may first confirm that the required customized SDR and the customized PEF do not exist in the customized region through the read instruction, and then adds the required customized SDR and the customized PEF through the add instruction.

The external system may comprise a controller connected to the BMC through an Intelligent Platform Management Bus (IPMB), or a monitoring program of an operating system connected to the BMC through an input/output port (I/O port). Besides, the customized SDR added by the external system may be a monitored value monitored by the monitoring program.

In addition, the method for controlling the BMC having the customized SDR may further comprise the steps of determining whether the customized SDR fails to be updated in a clearing period; and deleting the customized SDR and the corresponding customized PEF if the customized SDR fails to be updated in the clearing period.

In view of the above, the method for controlling the BMC having the customized SDR provides the instruction set to the external system and has high flexibility. Since the customized SDR and the customized PEF are reserved during updating the BMC, the time for defining again is saved, thus avoiding the abnormity of the system.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used

DETAILED DESCRIPTION OF THE INVENTION

The detailed features and advantages of the present invention are described below in great detail through the following embodiments, the content of the detailed description is sufficient for those skilled in the art to understand the technical content of the present invention and to implement the present invention there accordingly. Based upon the content of the specification, the claims, and the drawings, those skilled in the art can easily understand the relevant objectives and advantages of the present invention.

The present invention is a method for controlling a Baseboard Management Controller (BMC) having a customized sensor data record (SDR), which is applicable in the BMC having a memory, and the BMC is used to manage a server.

Figure 1:
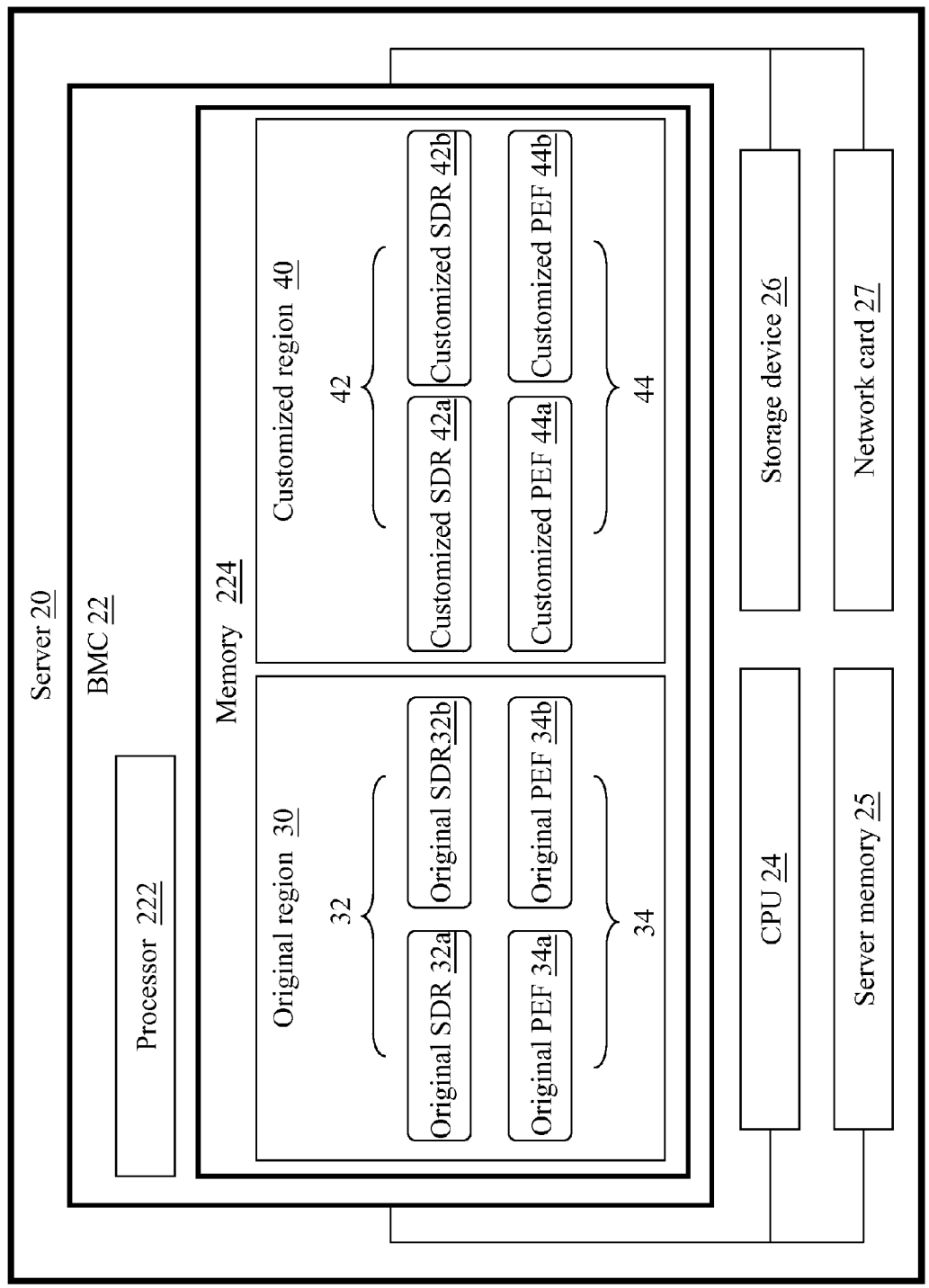
FIG. 1 is a schematic view of a BMC according to an embodiment.

Referring to FIG. 1, a schematic view of a BMC according to an embodiment is shown. In addition to the BMC 22, the server 20 further comprises a central processor unit (CPU) 24, a server memory 25, a storage device 26, and a network card 27. The BMC 22 may comprise a processor 222 and the memory 224, and provides services to at least one external system (not shown). The memory 224 may be a read only memory (ROM) or a random access memory (RAM), and the data stored in the memory 224 does not disappear when the memory 224 is not powered.

The server 20 may support an Intelligent Platform Management Interface (IPMI) and executes an operating system through the above hardware. The server 20 may use the operating systems such as Linux of Unix, Free BSD or Windows Server 2003 of Microsoft, or may use a Disk Operating System (DOS) or an Extensible Firmware Interface (EFI) system. The server 20 may be various server products with various brands, and it is not limited in the present invention.

Specifically, the IPMI is a standard architecture of a server management platform, and comprises five components, namely, the BMC 22, a System Interface, a Non-volatile Storage, an Intelligent Platform Management Bus (IPMB), and an Intelligent Chassis Management Bus (ICMB), in which, the most important component is the BMC 22.

The BMC 22 may also be referred to as a management chip, and can monitor the operation condition of the server 20. The server 20 may be easily powered on or powered off through the BMC 22. In addition, the BMC is just like an independent computer, and comprises the processor 222 and the memory 224 thereof. The BMC 22 operates in the case that the server 20 does not start, and the operation of the BMC uses the resources thereof and does not occupy other resources of the hardware modules of the server 20. For example, the BMC 22 may use an iLO system of HP company, an iDRAC system of DELL company, or an ESB2 system of Intel company.

Figure 2:
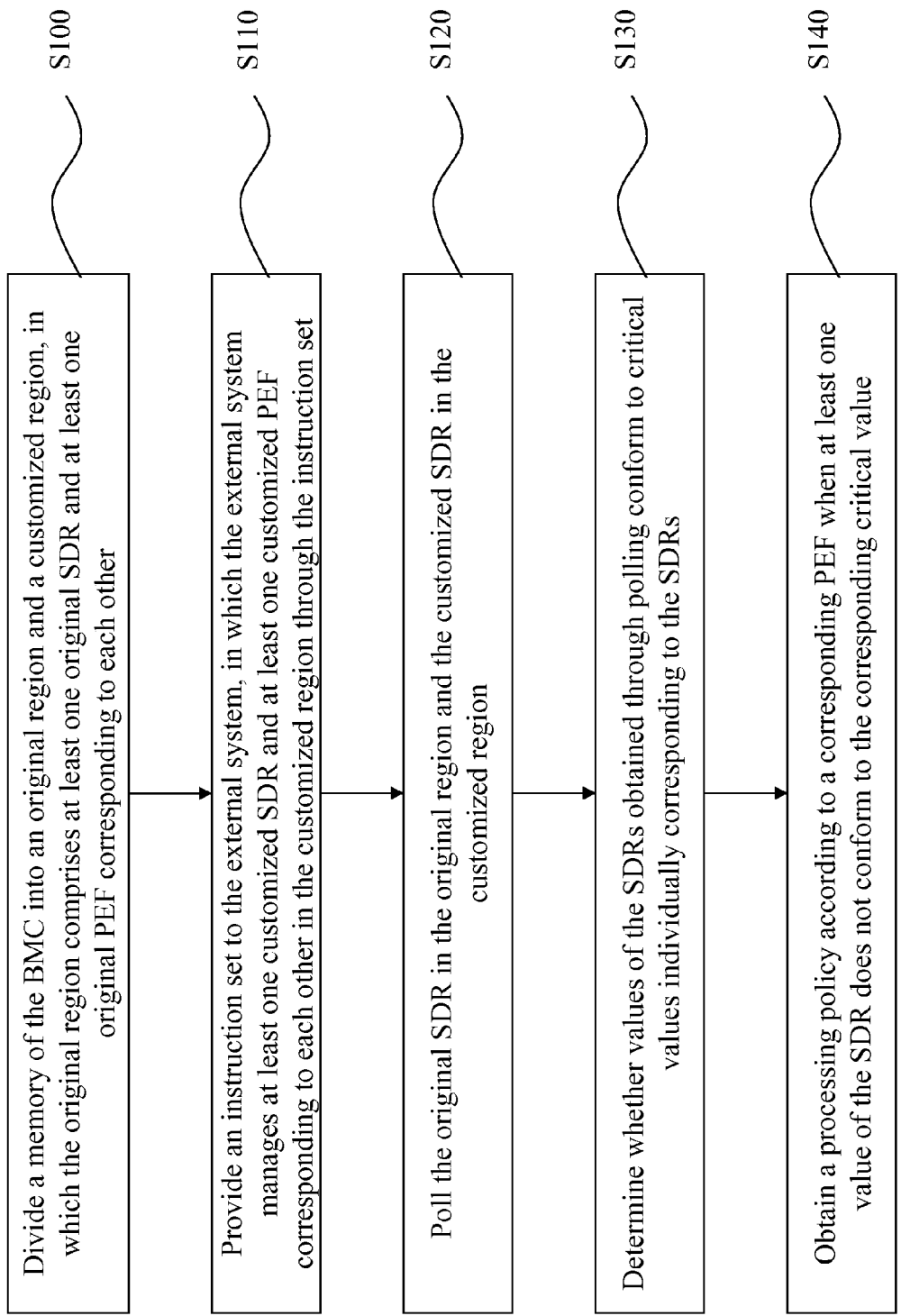
FIG. 2 is a flow chart of a method for controlling a BMC having a customized SDR according to an embodiment.

Referring to FIG. 2 in combination with FIG. 1, FIG. 2 is a flow chart of a method for controlling a BMC having a customized SDR according to an embodiment.

First, the memory 224 of the BMC 22 is divided into an original region 30 and a customized region 40, in which the original region 30 comprises at least one original SDR 32 and at least one original platform event filter (PEF) 34 corresponding to each other (Step S100). The original region 30 provides services to the BMC 22 to perform common operation, and the customized region 40 provides services to the BMC 22 and the external system.

Specifically, through a plurality of originally existing sensors on the various hardware modules configured in the server 20 such as the central processor 24, the server memory 25, the storage device 26, and the network card 27, the BMC 22 may monitor the operation conditions of the hardware modules. The originally existing sensors respectively sense responsible hardware modules, and periodically write the state of the responsible hardware modules into corresponding SDRs 32. The sensors capable of monitoring and corresponding to all the BMCs 22 with the same model are fixed and the same. Each original PEF 34 has at least one processing policy, such as starting, restarting or warning the manager. The BMC 22 may filter out a corresponding processing policy through the original PEF 34 against the abnormal events according to the value of the original SDR 32.

For example, the BMC 22 itself has the sensor monitoring the temperature of the CPU 24 and the sensor sensing the load of the server memory 25. The sensor monitoring the temperature of the CPU 24 corresponds to the original SDR 32a and the original PEF 34a, and the sensor sensing the load of the server memory 25 corresponds to the original SDR 32b and the original PEF 34b. The BMC 22 may know the temperature of the CPU 24 according to the original SDR 32a, and determines the processing policy performed in the present temperature according to the original PEF 34a.

The method for controlling the BMC having the customized SDR also comprises the step of providing an instruction set to an external system, in which the external system manages at least one customized SDR 42 and at least one customized PEF 44 corresponding to each other through the instruction set (Step S110). The instruction set may comprise an add instruction, and the external system adds the customized SDR 42 and the customized PEF 44 corresponding to each other in the customized region 40 through the add instruction. That is to say, the customized SDR 42 and the customized PEF 44 stored in the customized region 40 do not belong to the originally existing sensor of the BMC 22, but belong to the sensor of the external system.

The external system may comprise a controller connected to the BMC 22 through the IPMB, or a monitoring program of the operating system connected to the BMC 22 through an input/output port (I/O port). For example, the external system may be the controller of the network card 27, and may monitor the network card 27 through an extra sensor. The controller of the network card 27 (that is the external system) may add customized SDRs 42a and customized PEFs 44a in pairs in the customized region 40 through the add instruction. Likewise, the storage device 26 or other controllers of the hardware modules may add customized SDRs 42b and customized PEFs 44b in pairs in the customized region 40. Besides, the customized SDR added by the external system may be a monitored value monitored by the monitoring program. For example, the customized SDR may be a state value of a hard disk of the server 20, the temperature of CPU 24, or the loading of the network card 27.

The instruction set may further comprise an update instruction or a read instruction, and the external system updates or reads the customized SDR 42 added by itself in the customized region 40 through the update instruction or the read instruction respectively. According to an embodiment, the external system may first confirm that the required customized SDR 42 and the customized PEF 44 do not exist in the customized region 40 through the read instruction, and then add the required customized SDR 42 and the customized PEF 44 through the add instruction.

The instruction set may also comprise a delete instruction, and the external system deletes the customized SDR 42 and the customized PEF 44 added by itself in the customized region 40 through the delete instruction. It should be noted that, any external system can only delete the customized SDR 42 and the customized PEF 44 added by itself, but cannot delete the customized SDR 42 and the customized PEF 44 added by other external systems.

Before the update instruction or the delete instruction is executed, a locking program cam be executed automatically, so as to prohibit the BMC 22 from accessing the customized SDR 42 or the customized PEF 44 to be updated or deleted. Through the locking program, the BMC 22 does not read the customized region 40 and perform a corresponding process during update or deletion in the external system. Therefore, the error of information disorder or wrong determination caused by a program reading the customized SDR 42 or the customized PEF 44 being deleted is prevented.

In addition, the external system transmits the instruction set such as the add instruction, the update instruction, the read instruction or the delete instruction to the BMC 22, and then the BMC 22 executes according to the content of the instruction. Therefore, the external system can provide the BMC 22 with information not existing originally and a corresponding processing policy through automatic addition, or through the update of the customized SDR 42 or the customized PEF 44. In this way, the original SDR 32 and the original PEF 34 in the whole BMC 22 are not changed due to the individual requirement on the customized sensor. That is to say, even if different requirements on the BMC 22 exist, a quite flexible method for managing the BMC 22 can be provided.

When BMC firmware needs to be updated, only the data in the original region 30 is updated, and the customized region 40 is not affected. The BMC firmware may be a driver of the BMC 22 or the above original PEF 34. For example, when the firmware version of the BMC 22 needs to be updated, the customized SDR 42 and the customized PEF 44 are reserved, thus avoiding the problem that the BMC 22 needs to be added again or even the abnormality of the external system is caused since the update of the BMC 22 is emptied.

After the customized SDR 42 and the customized PEF 44 are added, the external system updates the corresponding customized SDR 42 after the quantification of the condition according to the condition sensed periodically by the respective sensor. The BMC 22 polls the original SDR 32 in the original region and the customized SDR 42 in the customized region (Step S120).

The BMC 22 may determine whether values of the SDRs (comprising the original SDR 32 and the customized SDR 42) through polling conform to a plurality of critical values respectively corresponding to the SDRs (Step S130). When at least one value of the SDR does not conform to the corresponding critical value, the BMC 22 obtains the processing policy to be performed according to the corresponding PEF (comprising the original PEF 34 and the customized PEF 44) as mentioned above (Step S140). Therefore, the BMC is merely required to poll the customized SDR 42 in a general manner, and thus additionally controls the hardware module not originally having a direct sensor.

Figure 3:
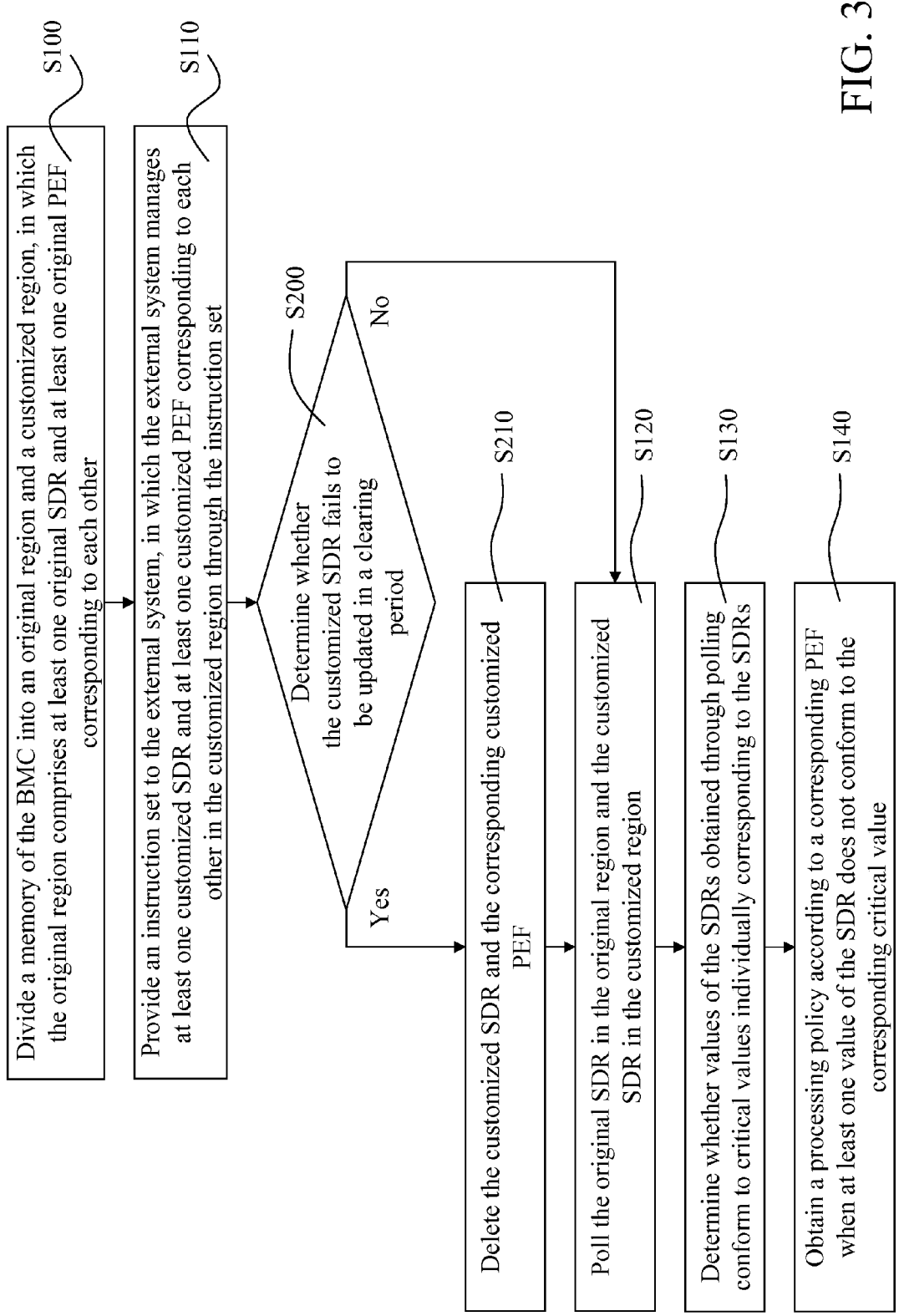
FIG. 3 is a flow chart of a method for controlling a BMC having a customized SDR according to another embodiment.

According to another embodiment, the method for controlling the BMC having the customized SDR is shown in FIG. 3. The BMC may determine whether the customized SDR 42 fails to be updated in a clearing period (Step S200), and deletes this non-updated customized SDR 42 and the corresponding customized PEF 44 if the customized SDR 42 fails to be updated in the clearing period (Step S210). The customized SDR 42 which is not updated in a long time is possibly caused by the case that the corresponding external system does not operate in a long time. Therefore, the customized SDR 42 and the customized PEF 44 which are not used are cleared according to the clearing period, such that the customized region 40 can be efficiently maintained, and the BMC 22 is avoided from wasting unnecessary time on the customized SDR 42 and the customized PEF 44 which are not used. In addition, even if the corresponding external system operates again, the required customized SDR 42 and the customized PEF 44 can be automatically added without causing abnormity.

In the view of the above, the method for controlling the BMC having the customized SDR provides the instruction set to the external system so as to automatically add or update the customized SDR and the customized PEF, thus providing a quite flexible method for managing the BMC. When the BMC needs to be updated, since the customized SDR and the customized PEF are reserved, the time for adding the customized SDR and the customized PEF is saved, thus avoiding the abnormity of the system.

What is claimed is:

1. A method for controlling a Baseboard Management Controller (BMC) having a customized sensor data record (SDR), applicable to the BMC having a memory, wherein the BMC provides services to at least one external system, the method comprising:

dividing the memory of the BMC into an original region and a customized region, wherein the original region comprises at least one original SDR and at least one original platform event filter (PEF) corresponding to each other;

providing an instruction set to the external system, wherein the external system manages at least one customized SDR and at least one customized PEF corresponding to each other in the customized region through the instruction set;

determining whether the customized SDR fails to be updated in a clearing period;

deleting the customized SDR and the corresponding customized PEF if the customized SDR fails to be updated in the clearing period;

polling the original SDR in the original region and the customized SDR in the customized region;

determining whether values of the SDRs obtained through polling conform to a plurality of critical values individually corresponding to the SDRs; and obtaining a processing policy according to the corresponding PEF when at least one value of the SDR does not conform to the corresponding critical value.

2. The method for controlling the BMC having the customized SDR according to claim 1, wherein the instruction set comprises an add instruction, and the external system adds at least one of the customized SDR and at least one of the customized PEF corresponding to each other through the add instruction.

3. The method for controlling the BMC having the customized SDR according to claim 2, wherein the instruction set comprises an update instruction, the external system updates the customized SDR added by itself in the customized region through the update instruction, and a locking program is automatically executed before the update instruction is executed, so as to prohibit the BMC from accessing the customized SDR to be updated.

4. The method for controlling the BMC having the customized SDR according to claim 2, wherein the instruction set comprises a delete instruction, the external system deletes the customized SDR and the customized PEF added by itself in the customized region through the delete instruction, and a locking program is automatically executed before the delete instruction is executed, so as to prohibit the BMC from accessing the customized SDR or the customized PEF to be deleted.

5. The method for controlling the BMC having the customized SDR according to claim 2, wherein the instruction set comprises a read instruction, and the external system reads the customized SDR added by itself in the customized region through the read instruction.

6. The method for controlling the BMC having the customized SDR according to claim 1, wherein the external system comprises a controller connected to the BMC through an Intelligent Platform Management Bus (IPMB), or a monitoring program of an operating system connected to the BMC through an input/output port (I/O port).

7. A method for controlling a Baseboard Management Controller (BMC) having a customized sensor data record (SDR), applicable to the BMC having a memory, wherein the BMC provides services to at least one external system, the method comprising:
   dividing the memory of the BMC into an original region and a customized region, wherein the original region comprises at least one original SDR and at least one original platform event filter (PEF) corresponding to each other;
   providing an instruction set to the external system to manage at least one customized SDR and at least one customized PEF corresponding to each other in the customized region through the instruction set, wherein the instruction set comprises an add instruction and a read instruction, the external system adds the customized SDR and the customized PEF corresponding to each other through the add instruction, and the external system reads the customized SDR added by itself in the customized region through the read instruction;
   polling the original SDR in the original region and the customized SDR in the customized region;
   determining whether values of the SDRs obtained through polling conform to a plurality of critical values individually corresponding to the SDRs; and
   obtaining a processing policy according to the corresponding PEF when at least one value of the SDR does not conform to the corresponding critical value;
   wherein, the external system first confirms that the required customized SDR and the customized PEF do not exist in the customized region through the read instruction, and then adds the required customized SDR and the customized PEF through the add instruction.

8. The method for controlling the BMC having the customized SDR according to claim 7, wherein the instruction set comprises an update instruction, the external system updates the customized SDR added by itself in the customized region through the update instruction, and a locking program is automatically executed before the update instruction is executed, so as to prohibit the BMC from accessing the customized SDR to be updated.

9. The method for controlling the BMC having the customized SDR according to claim 7, wherein the instruction set comprises a delete instruction, the external system deletes the customized SDR and the customized PEF added by itself in the customized region through the delete instruction, and a locking program is automatically executed before the delete instruction is executed, so as to prohibit the BMC from accessing the customized SDR or the customized PEF to be deleted.

10. The method for controlling the BMC having the customized SDR according to claim 7, wherein the external system comprises a controller connected to the BMC through an Intelligent Platform Management Bus (IPMB), or a monitoring program of an operating system connected to the BMC through an input/output port (I/O port).

11. The method for controlling the BMC having the customized SDR according to claim 7, further comprising:
   determining whether the customized SDR fails to be updated in a clearing period; and
   deleting the customized SDR and the corresponding customized PEF if the customized SDR fails to be updated in the clearing period.

* * * * *